US012626106B2

(12) United States Patent
Shlens et al.

(10) Patent No.: US 12,626,106 B2
(45) Date of Patent: May 12, 2026

(54) MACHINE LEARNING MODELS FOR BEHAVIOR UNDERSTANDING

(71) Applicant: Google LLC, Mountain View, CA (US)

(72) Inventors: Jonathon Shlens, San Francisco, CA (US); Vijay Vasudevan, Los Altos Hills, CA (US); Jiquan Ngiam, Mountain View, CA (US); Benjamin James Caine, San Francisco, CA (US); Zhengdong Zhang, Mountain View, CA (US); Zhifeng Chen, Sunnyvale, CA (US); Hao-Tien Chiang, Sunnyvale, CA (US); David Joseph Weiss, Wayne, PA (US); Jeffrey Ling, Brooklyn, NY (US); Ashish Venugopal, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 1017 days.

(21) Appl. No.: 17/828,778

(22) Filed: May 31, 2022

(65) Prior Publication Data

US 2022/0383076 A1 Dec. 1, 2022

Related U.S. Application Data

(60) Provisional application No. 63/194,577, filed on May 28, 2021.

(51) Int. Cl.
*G06N 3/045* (2023.01)
*G06N 3/047* (2023.01)
*G06N 3/049* (2023.01)

(52) U.S. Cl.
CPC ............. *G06N 3/047* (2023.01); *G06N 3/045* (2023.01); *G06N 3/049* (2013.01)

(58) Field of Classification Search
CPC ........ G06N 3/047; G06N 3/045; G06N 3/049; G06N 3/09; G06N 3/096; G06N 3/0455;
(Continued)

(56) References Cited

FOREIGN PATENT DOCUMENTS

CN 110574049 A 12/2019
CN 110618678 A 12/2019
(Continued)

OTHER PUBLICATIONS

Yang ("Traffic Agent Trajectory Prediction Using Social Convolution and Attention Mechanism") 2020 IEEE Intelligent Vehicles Symposium (IV) Oct. 20-23, 2020. Las Vegas, USA (Year: 2020).*
(Continued)

*Primary Examiner* — Usmaan Saeed
*Assistant Examiner* — Su-Ting Chuang
(74) *Attorney, Agent, or Firm* — Fish & Richardson P.C.

(57) ABSTRACT

A method for performing one or more tasks, wherein each of the one or more tasks includes predicting behavior of one or more agents in an environment, the method comprising: obtaining a three-dimensional (3D) input tensor representing behaviors of the one or more agents in the environment across a plurality of time steps; generating an encoded representation of the 3D input tensor by processing the 3D input tensor using an encoder neural network, wherein 3D input tensor comprises a plurality of observed cells and a plurality of masked cells; and processing the encoded representation of the 3D input tensor using a decoder neural network to generate a 4D output tensor.

25 Claims, 4 Drawing Sheets

(58) Field of Classification Search
CPC .......... G06N 3/063; G06N 3/08; G06Q 10/04; G06F 18/214
See application file for complete search history.

(56) References Cited

FOREIGN PATENT DOCUMENTS

| CN | 111152796 A | 5/2020 |
| CN | 111612126 A | 9/2020 |

OTHER PUBLICATIONS

Alahi et al., "Social LSTM Human trajectory prediction in crowded spaces," Presented at Proceedings of the IEEE Conference on Computer Vision and Pattern Recognition, Las Vegas, NV, USA, Jun. 27-30, 2016, 11 pages.

Arjovsky et al., "Invariant risk minimization," CoRR, submitted on Jul. 5, 2019, arXiv:1907.02893v1, 30 pages.

Bansal et al., "Chauffeurnet: Learning to drive by imitating the best and synthesizing the worst," Presented at Proceedings of Robotics: Science and Systems, FreiburgimBreisgau, Germany, Jun. 22-26, 2019, 10 pages.

Bello et al., "Attention augmented convolutional networks," Presented at Proceedings of the IEEE/CVF International Conference on Computer Vision, Seoul, South Korea, Oct. 27-Nov. 2, 2019, 10 pages.

Bello, "LambdaNetworks: Modeling long-range interactions without attention," Presented at International Conference on Learning Representations, Vienna, Austria, May 3-7, 2021, 31 pages.

Bhat et al., "Trajformer: Trajectory prediction with local self-attentive contexts for autonomous driving," CoRR, submitted on Nov. 30, 2020, arXiv:2011.14910v1, 6 pages.

Biktairov et al., "Prank: motion prediction based on ranking," Presented at Advances in Neural Information Processing Systems, virtual conference, Dec. 6-12, 2020, 11 pages.

Brown et al., "Language models are few-shot learners," Presented at Advances in Neural Information Processing Systems, virtual conference, Dec. 6-12, 2020, 25 pages.

Buhet et al., "PLOP: Probabilistic polynomial objects trajectory planning for autonomous driving," CoRR, submitted on Mar. 9, 2020, arXiv:2003.08744v1, 8 pages.

Caesar et al., "nuScenes: A multimodal dataset for autonomous driving," Presented at Proceedings of the IEEE/CVF Conference on Computer Vision and Pattern Recognition, Seattle, WA, USA, Jun. 13-19, 2020, pp. 11621-11631.

Carion et al., "End-to-end object detection with transformers," CoRR, submitted on May 28, 2020, arXiv:2005.12872v3, 26 pages.

Casas et al., "Implicit latent variable model for scene-consistent motion forecasting," CORR, Submitted on Jul. 23, 2020, arXiv:2007.12036v1, 44 pages.

Casas et al., "Spagnn: Spatially-aware graph neural networks for relational behavior forecasting from sensor data," Presented at 2020 IEEE International Conference on Robotics and Automation, Paris, France, May 31-Aug. 31, 2020, pp. 9491-9497.

Chai et al., "Multipath: Multiple probabilistic anchor trajectory hypotheses for behavior prediction," CoRR, Submitted on Oct. 12, 2019, arXiv:1910.05449v1, 14 pages.

Chandra et al., "TraPHic: Trajectory prediction in dense and heterogeneous traffic using weighted interactions," CoRR, submitted on Dec. 2, 2019, arXiv:1812.04767v3, 10 pages.

Chang et al., "Argoverse: 3D tracking and forecasting with rich maps," Presented at Proceedings of the IEEE/CVF Conference on Computer Vision and Pattern Recognition, Long Beach, CA, Jun. 15-20, 2019, pp. 8748-8757.

Cui et al., "Multimodal trajectory predictions for autonomous driving using deep convolutional networks," Presented at Proceedings of 2019 International Conference on Robotics and Automation, Montreal, Canada, May 20-24, 2019, 7 pages.

Dai et al., "Transformer-XL: Attentive language models beyond a fixed-length context," CoRR, Submitted on Jun. 2, 2019, arXiv:1901.02860v3, 20 pages.

Deo et al., "Trajectory forecasts in unknown environments conditioned on grid-based plans," CoRR, submitted on Apr. 29, 2021, arXiv:2001.00735v2, 12 pages.

Devlin et al., "Bert: Pre-training of deep bidirectional transformers for language understanding," Presented at Proceedings of NAACL-HLT 2019, Minneapolis, MN, USA, Jun. 2-7, 2019, pp. 4171-4186.

Dosovitskiy et al., "An image is worth 16x16 words: Transformers for image recognition at scale," Presented at Proceedings of the International Conference on Learning Representations, Vienna, Austria, May 4-7, 2021, 21 pages.

Ettinger et al., "Large scale interactive motion forecasting for autonomous driving: The waymo open motion dataset," CoRR, submitted on Apr. 20, 2021, arXiv:2104.10133v1, 15 pages.

Gao et al., "VectorNet: Encoding hd maps and agent dynamics from vectorized representation," Presented at Proceedings of the IEEE/CVF Conference on Computer Vision and Pattern Recognition, Seattle WA, Jun. 13-19, 2020, 9 pages.

Gilles et al., "HOME: heatmap output for future motion estimation," CoRR, Submitted on May 23, 2021, arXiv:2105.10968v1, 8 pages.

Giuliari et al., "Transformer networks for trajectory forecasting," Presented at International Conference on Pattern Recognition, Milan, Italy, Sep. 13-18, 2020, 8 pages.

Glorot et al., "Understanding the difficulty of training deep feedforward neural networks," Presented at Proceedings of the thirteenth international conference on artificial intelligence and statistics, JMLR Workshop and Conference Proceedings, Sardinia, Italy, May 13-15, 2010, pp. 249-256.

Gu et al., "Densetnt: End-to-end trajectory prediction from dense goal sets," Presented at IEEE/CVF International Conference on Computer Vision, Virtual Conference, Oct. 10-17, 2021, 10 pages.

Gupta et al., "Social GAN: Socially acceptable trajectories with generative adversarial networks," Presented at IEEE/CVF Conference on Computer Vision and Pattern Recognition, Salt Lake City, UT, Jun. 18-22, 2018, 10 pages.

Ho et al., "Axial attention in multidimensional transformers," CoRR, submitted on Dec. 20, 2019, arXiv:1912.12180v1, 11 pages.

Hong et al., "Rules of the road: Predicting driving behavior with a convolutional model of semantic interactions," Presented at IEEE/CVF Conference on Computer Vision and Pattern Recognition, Long Beach, CA, Jun. 16-19, 2019, 9 pages.

Hung et al., "SoDA: Multi-object tracking with soft data association," CoRR, submitted on Aug. 19, 2020, arXiv:2008.07725v2, 13 pages.

Ioffe et al., "Batch normalization: Accelerating deep network training by reducing internal covariate shift," Presented at International conference on machine learning, Lille, France, Jul. 6-11, 2015, 9 pages.

Jouppi, "In-datacenter performance analysis of a tensor processing unit," CoRR, submitted on Apr. 2017, arxiv:1704.04760v1, 17 pages.

Khandelwal et al., "What-if motion prediction for autonomous driving," CoRR, submitted on Aug. 24, 2020, arXiv:2008.10587v1, 16 pages.

Kingma et al., "Adam: A method for stochastic optimization," Presented at International Conference on Learning Representations, San Diego, CA, May 7-9, 2015; CoRR, Submitted Jan. 30, 2017, arXiv:1412.6980v9, 15 pages.

Lee et al., "Desire: Distant future prediction in dynamic scenes with interacting agents," Presented at Proceedings of the IEEE Conference on Computer Vision and Pattern Recognition, Honolulu, HI, Jul. 21-26, 2017, pp. 336-345.

Level5.lyft.com [offline], "Lyft level 5 perception dataset," available on or before Aug. 6, 2019, via Internet Archive: Wayback Machine URL <https://web.archive.org/web/20190806143234/https://level5.lyft.com/dataset/>, retrieved Sep. 9, 2024, 11 pages.

Li et al., "End-to-end contextual perception and prediction with interaction transformer," Presented at IEEE/RSJ International Conference on Intelligent Robots and Systems, Las Vegas, NV, Oct. 24, 2020-Jan. 24, 2021, CoRR, Submitted Aug. 13, 2020, arXiv:2008.05927v1, 8 pages.

(56) References Cited

OTHER PUBLICATIONS

Liang et al., "Learning Lane Graph Representations for Motion Forecasting," Presented at European Conference on Computer Vision, Glasgow, UK, Aug. 23-28, 2020; CoRR, Submitted Jul. 27, 2020, arXiv:2007.13732v1, 18 pages.

Liu et al., "Deep structured reactive planning," CoRR, submitted on Jan. 18, 2021, arXiv:2101.06832v1, 15 pages.

Marchetti et al., "Mantra: Memory augmented networks for multiple trajectory prediction," Presented at Proceedings of the IEEE/CVF Conference on Computer Vision and Pattern Recognition, Seattle, WA, Jun. 13-19, 2020, pp. 7143-7152.

Mercat et al., "Multi-head attention for joint multi-modal vehicle motion forecasting," Presented at IEEE/RSJ International Conference on Intelligent Robots and Systems, Virtual Conference, May 31-Aug. 1, 2020, 7 pages.

Meyer et al., "Learning an uncertainty-aware object detector for autonomous driving," Presented at IEEE/RSJ International Conference on Intelligent Robots and Systems, Virtual Conference, May 31-Aug. 1, 2020; CoRR, Submitted on Feb. 3, 2020, arXiv:1910. 11375v2, 7 pages.

Montemerlo et al., "Junior: The Stanford Entry in the Urban Challenge," Journal of Field Robotics, Aug. 2008, 25(9):569-597.

Pellegrini et al., "You'll never walk alone: Modeling social behavior for multi-target tracking," Presented at 2009 IEEE 12th International Conference on Computer Vision, Kyoto, Japan, Sep. 27-Oct. 4, 2009, pp. 261-268.

Qi et al., "Pointnet: Deep learning on point sets for 3d classification and segmentation," Presented at Proceedings of the IEEE conference on computer vision and pattern recognition, Honolulu, HI, Jul. 21-26, 2017, pp. 652-660.

Ramachandran et al., "Stand-alone self-attention in vision models," Presented at Advances in Neural Information Processing Systems, Vancouver, Canada, Dec. 8-14, 2019, 13 pages.

Rhinehart et al., "Precog: Prediction conditioned on goals in visual multi-agent settings," Presented at Proceedings of the IEEE/CVF International Conference on Computer Vision, Seoul, Korea (South), Oct. 27-Nov. 2, 2019, pp. 2821-2830.

Sadat et al., "Perceive, predict, and plan: Safe motion planning through interpretable semantic representations," Presented at European Conference on Computer Vision, Glasgow, UK, Aug. 23-28, 2020, pp. 414-430.

Salzmann et al., "Trajectron++: Dynamically-feasible trajectory forecasting with heterogeneous data," CoRR, submitted on Jan. 9, 2020, arXiv:2001.03093v1, 13 pages.

Schölkopf et al., "Toward causal representation learning," CoRR, Submitted on Feb. 22, 2021, arXiv:2102.11107v1, 24 pages.

Srinivas et al., "Bottleneck transformers for visual recognition," Presented at IEEE/CVF Conference on Computer Vision and Pattern Recognition, Virtual Conference, Jun. 19-25, 2021, 11 pages.

Suo et al., "Trafficsim: Learning to simulate realistic multi-agent behaviors," Presented at IEEE/CVF Conference on Computer Vision and Pattern Recognition, Virtual Conference, Jun. 19-25, 2021, 10 pages.

Szegedy et al., "Re-thinking the inception architecture for computer vision," Presented at Proceedings of the IEEE Conference on Computer Vision and Pattern Recognition, Las Vegas, NV, USA, Jun. 27-30, 2016, 9 pages.

Tang et al., "Multiple futures prediction," Presented at Advances in Neural Information Processing Systems, Vancouver, Canada, Dec. 8-14, 2019, 11 pages.

Thrun et al., "Stanley: The robot that won the darpa grand challenge," Journal of Field Robotics, Jun. 2006, 23(9):661-692.

Tolstaya et al., "Identifying driver interactions via conditional behavior prediction," CoRR, Submitted on Apr. 20, 2021, arXiv:2104. 09959v1, 7 pages.

Vaswani et al., "Attention is all you need," Advances in Neural Information Processing Systems, Long Beach, CA, Dec. 4-9, 2017, 11 pages.

Vaswani et al., "Scaling local self-attention for parameter efficient visual backbones," Presented at IEEE/CVF Conference on Computer Vision and Pattern Recognition, Virtual Conference, Jun. 19-25, 2021, 11 pages.

Wang et al., "Axial-deeplab: Stand-alone axial-attention for panoptic segmentation," CoRR, Submitted on Aug. 6, 2020, arXiv:2003. 07853v2, 26 pages.

Yeh et al., "Diverse generation for multi-agent sports games," Presented at Proceedings of the IEEE/CVF Conference on Computer Vision and Pattern Recognition, Long Beach, CA, Jun. 15-20, 2019, pp. 4610-4619.

Yu et al., "Spatio-temporal graph transformer networks for pedestrian trajectory prediction," In European Conference on Computer Vision, Glasgow, UK, Aug. 23-28, 2020; CoRR, Submitted Jul. 24, 2020, arXiv:2005.08514v2, 19 pages.

Yuan et al., "Agentformer: Agent-aware transformers for socio-temporal multi-agent forecasting," CoRR, submitted on Mar. 25, 2021, arXiv:2103.14023, 14 pages.

Zeng et al., "End-to-end interpretable neural motion planner," Presented at Proceedings of the IEEE/CVF Conference on Computer Vision and Pattern Recognition, Long Beach, CA, USA, Jun. 15-20, 2019, pp. 8660-8669.

Zhan et al., "INTERACTION Dataset: An INTERnational, Adversarial and Cooperative moTION Dataset in Interactive Driving Scenarios with Semantic Maps," CoRR, submitted on Sep. 30, 2019, arXiv:1910. 03088v1, 13 pages.

Zhao et al., "TNT: Target-driven trajectory prediction," CoRR, submitted on Aug. 21, 2020, arXiv:2008.08294v2, 12 pages.

Ziegler et al., "Trajectory planning for bertha—a local, continuous method," Presented at 2014 IEEE Intelligent Vehicles Symposium Proceedings, Dearborn, MI, USA, Jun. 8-11, 2014, pp. 450-457.

Office Action in the Chinese Appln. No. 202210602726.7, mailed on Dec. 31, 2024, 14 pages (with English translation).

* cited by examiner

300

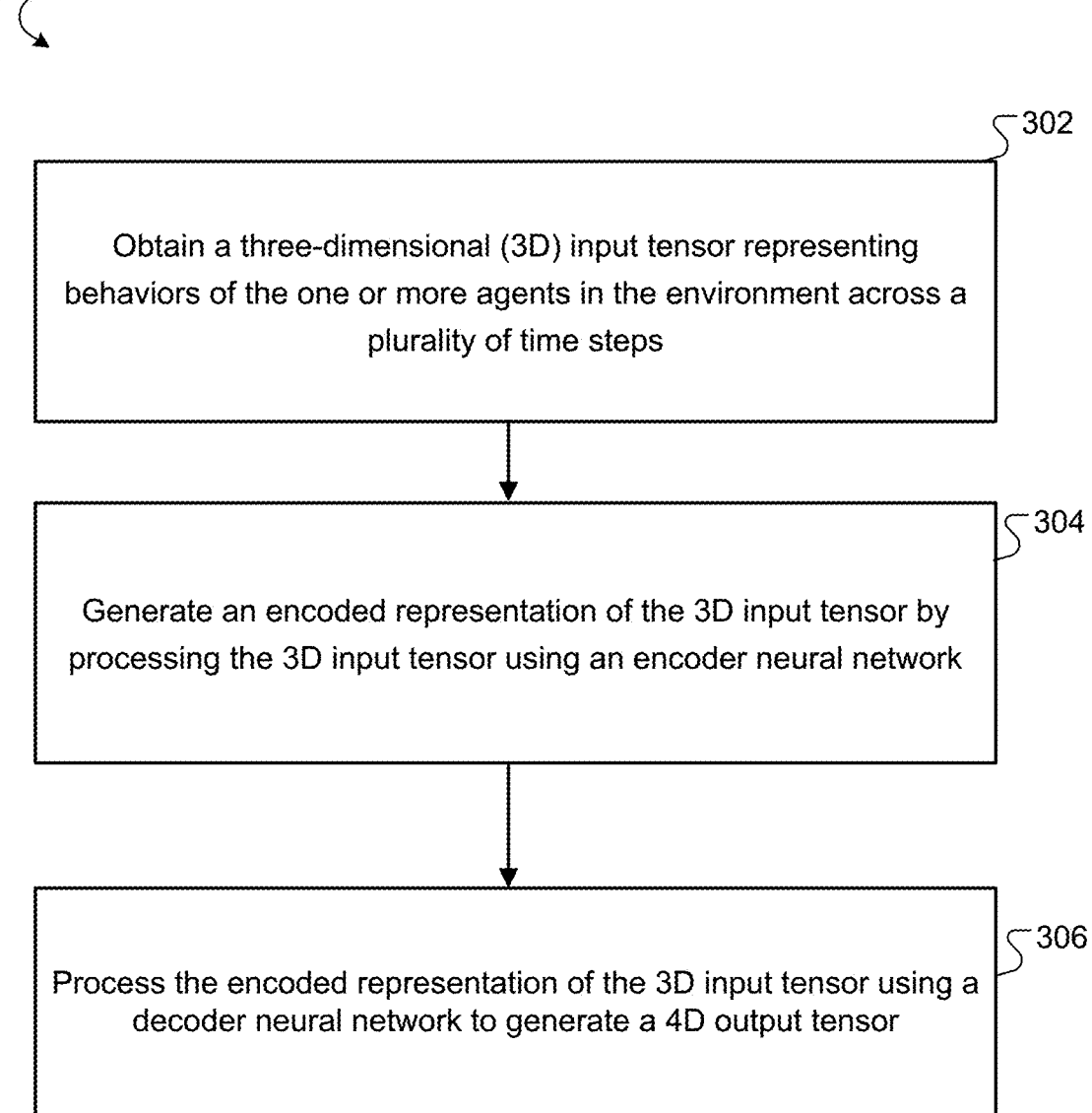

302

Obtain a three-dimensional (3D) input tensor representing behaviors of the one or more agents in the environment across a plurality of time steps

304

Generate an encoded representation of the 3D input tensor by processing the 3D input tensor using an encoder neural network

306

Process the encoded representation of the 3D input tensor using a decoder neural network to generate a 4D output tensor

FIG. 3

MACHINE LEARNING MODELS FOR BEHAVIOR UNDERSTANDING

CROSS REFERENCE TO RELATED APPLICATIONS

This application is a non-provisional of and claims priority to U.S. Provisional Patent Application No. 63/194,577, filed on May 28, 2021, the entire contents of which are hereby incorporated by reference.

BACKGROUND

This specification relates to a system that performs one or more machine learning tasks that require predicting the behavior of one or more agents in an environment using a neural network.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a neural network system implemented as computer programs on one or more computers in one or more locations that includes a neural network configured to perform one or more tasks, in which each of the one or more tasks includes predicting or planning behavior of one or more agents (or predicting behavior of a plurality of agents jointly) in an environment. The one or more tasks include at least one of a behavior prediction task, a conditional behavior prediction task, or a goal-directed planning task.

Particular embodiments of the subject matter described in this specification can be implemented so as to realize one or more of the following advantages.

Navigating dynamic environments necessitates predicting the interactions of multiple agents and the cascading effects of each potential future behavior of each agent. Such a problem is acute in many cases, for example, in the case of autonomous vehicles where agents (e.g. other vehicles and pedestrians) and their associated behaviors may be diverse, and decisions of an autonomous vehicle itself may influence the environment significantly. Many existing approaches decompose the problem into independently predicting future behaviors for each agent, and subsequently planning against these fixed predictions. However, these approaches suffer from an inability to accurately model interactions, and thus systematically fail to predict the behavior of each agent. In the case of navigation, some prior work has focused on dividing the problem of navigation into behavior prediction (or motion forecasting), i.e. predicting the potential future behaviors/trajectories of agents such as vehicles and pedestrians, and goal-directed planning, i.e. selecting a route that efficiently arrives at the destination taking into account the actions of other agents. Such a division, however, suffers from several challenges. First, propagating uncertainty across these tasks is challenging, especially if the systems are not trained with a single, unified objective. Second, interactions between agents largely dictate uncertainty, and formulating the problem into independent subtasks ignores this dimension.

To address the drawbacks of conventional systems, the techniques described in this specification allow a neural network to predict future behaviors of one or more agents or to jointly predict future behaviors of multiple agents in an environment in a unified manner. The neural network can capture the large, cascading interactions between agents and can be trained simultaneously on a plurality of tasks (e.g., behavior prediction, conditional behavior prediction and goal-oriented planning) by synergistically leveraging information from distinct data sources. The trained neural network is a unified model that can perform individual tasks by changing how one queries the model. By unifying the modeling, individual tasks often performed through heuristics may instead be learned from a large corpus of data. The described techniques eschew an agent-centric approach, and instead develop a global representation for all agents in an environment (including the autonomous vehicle itself). The techniques employs a simple variant of self-attention in which the attention mechanism is factorized across separate dimensions (instead of across multiple dimensions at the same time, which is computationally intensive and not scalable). The resulting neural network architecture only requires alternating attention between dimensions representing time and agents across the scene, thus being more computationally efficient and scalable compared to prior behavior prediction architectures.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow diagram of an example process for performing one or more tasks, in which each of the one or more tasks includes predicting behavior of one or more agents in an environment.

Like reference numbers and designations in the various drawings indicate like elements.

DETAILED DESCRIPTION

Figure 1:
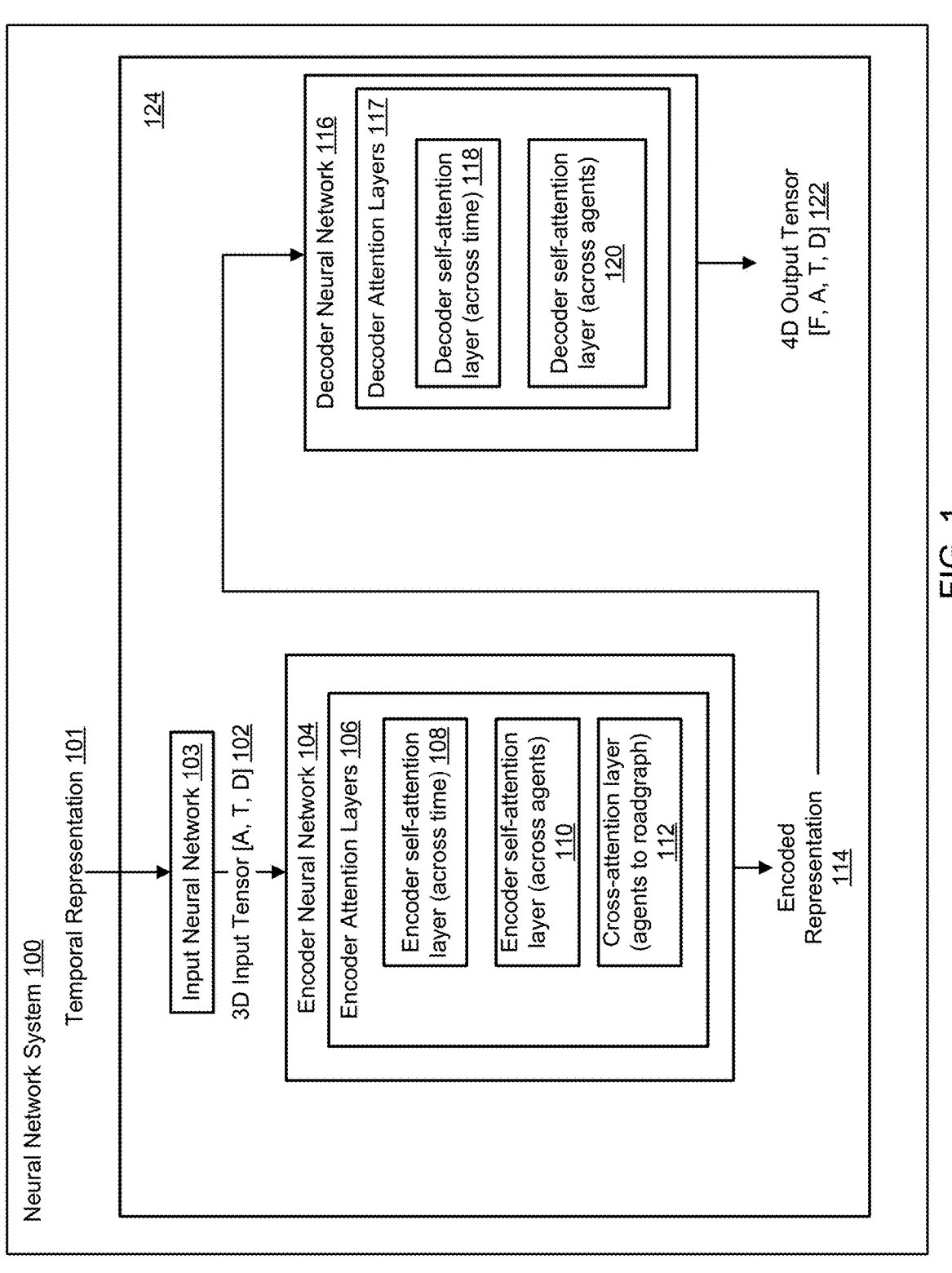
FIG. 1 shows an example neural network system that includes a neural network configured to perform one or more tasks.

This specification describes a neural network system implemented as computer programs on one or more computers in one or more locations that includes a neural network configured to perform one or more tasks, in which each of the one or more tasks includes predicting or planning behavior of one or more agents (or predicting behavior of a plurality of agents jointly) in an environment. The one or more tasks include at least one of a behavior prediction task, a conditional behavior prediction task, or a goal-directed planning task.

A behavior prediction task is a task that requires predicting future behaviors (or movements) of one or more agents in the environment given the past behaviors of multiple agents in the environment. Conditional behavior prediction is a task that requires predicting future behaviors (e.g., movements) of one or more agents in the environment given the past behaviors of multiple agents in the environment and given known planned movements in the future of one or more specified agents in the environment. A goal-directed planning task is a task that is planning future behaviors (e.g. movements) of one or more agents in the environment given (i) the past behaviors of agents in the environment and (ii) a respective goal location to be reached by each of the one or more agents.

In some implementations, the environment is a real-world environment, the input to the neural network system is sensor data of the real-world environment, and the one or more tasks require predicting the future behavior of agents captured in the sensor data. For instance, the neural network system is a mechanical agent interacting with the real-world environment in order to perform one or more tasks. For example, the agent may be a robot interacting with the environment to navigate to a specified destination in the environment. As another example, the agent may be an autonomous or semi-autonomous vehicle (e.g., a self-driving car) navigating through an environment (e.g., a dynamic environment of streets and highways) and the neural network is configured to predict movements of other agents (e.g., robots, vehicles, or pedestrians, or some combination of multiple different types of agents) in the environment.

In some implementations the environment is a simulated environment and the neural network system is an agent that is implemented as one or more computers interacting with the simulated environment. Training the agent in a simulated environment may enable the agent to learn from large amounts of simulated training data while avoiding risks associated with training the agent in a real world environment, e.g., damage to the agent due to performing poorly chosen actions. An agent trained in a simulated environment may thereafter be deployed in a real-world environment. For example the simulated environment may be a simulation of a robot or vehicle and the neural network system may be trained on the simulation. For example, the simulated environment may be a motion simulation environment, e.g., a driving simulation or a flight simulation, and the agent is a simulated vehicle navigating through the motion simulation.

FIG. 1 shows an example neural network system 100. The system 100 is an example of a system implemented as computer programs on one or more computers in one or more locations, in which the systems, components, and techniques described below can be implemented. The system 100 includes a neural network 124 configured to perform one or more tasks, in which each of the one or more tasks includes predicting behavior of one or more agents (or to predict behavior of a plurality of agents jointly) in an environment. For example, the one or more tasks include at least one of a behavior prediction task, a conditional behavior prediction task, or a goal-directed planning task.

The neural network 124 includes an encoder neural network 104 and a decoder neural network 116.

The encoder neural network 104 is configured to obtain as input a three-dimensional (3D) input tensor 102 that represents behaviors of the one or more agents in the environment across a plurality of time steps and to generate an encoded representation 114 of the 3D input tensor 102. The 3D input tensor 102, which can be denoted as [A, T, D], has (i) an agent dimension A that represents the one or more agents, (ii) a feature dimension D that represents, for each of the one or more agents, features corresponding to behavior of the agent, and (iii) a time dimension T that represents the plurality of time steps. As described below, the encoder neural network 104 includes encoder self-attention layers that each configured to apply a self-attention mechanism over the respective encoder attention layer input across the time dimension T and encoder self-attention layers that each configured to apply a self-attention mechanism over the respective encoder attention layer input across the agent dimension A. The encoded representation 114 of the 3D input tensor 102 includes updated features for each element of the [A, T, D] 3D input tensor 102.

Optionally, the encoder neural network 104 may be configured to compute the mean of the updated features across the agent and time dimension separately, and add these as an additional artificial agent dimension and time step dimension to generate the encoded representation 114 denoted as [A+1, T+1, D]. This artificial agent and time step propagate through the neural network 124, and provides the neural network 124 with extra capacity for representing each agent that is not tied to any time step. At the final attention neural network layer of the decoder neural network 116, these additional artificial agent and time step are sliced out of the tensor to generate the 4D output tensor 122, denoted as [F, A, T, D]. The sliced out feature includes a summary feature for each agent (the additional time per agent) and for the scene (the 'corner' feature that is both additional time and agent). This feature is then processed by, for example, one or more MLP neural network layers, to produce a single logit value to be used with a softmax classifier for a permutation equivariant estimate of probabilities of the F possible future behaviors. In particular, to obtain the 3D input tensor 102, the encoder neural network 104 may receive as input a temporal representation 101 that includes a characterization of the environment at each of a plurality of time steps, and processes, using an input neural network 103, the temporal representation 101 to generate the 3D input tensor 102. The input neural network may include one or more multi-layer perceptron (MLP) neural network layers.

Figure 2:
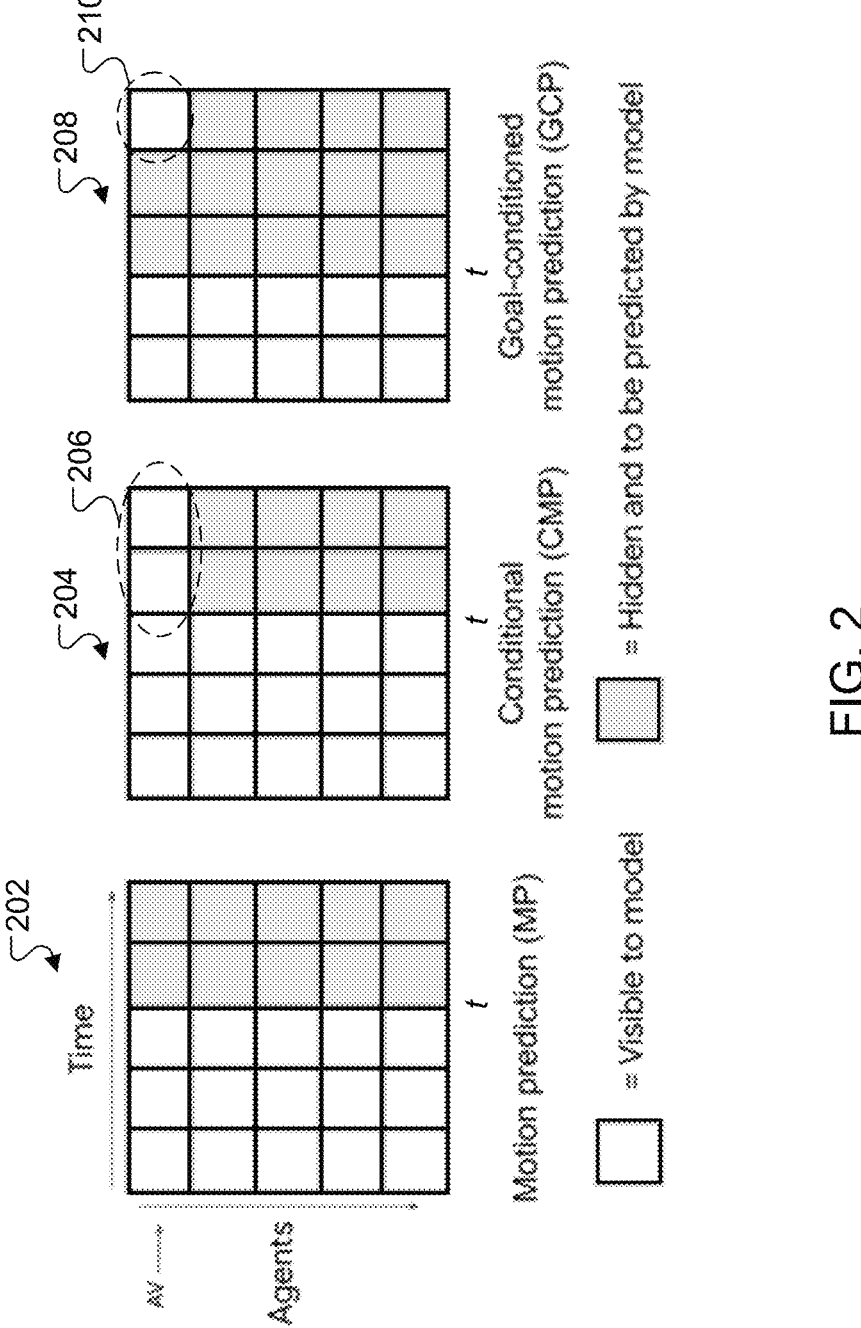
FIG. 2 shows different masking strategies for a 3D input tensor for different tasks.

The 3D input tensor 102 includes multiple observed cells and multiple masked cells. Each observed cell includes a specified value for a respective feature that corresponds to an observed behavior of a respective agent at a respective time step, and each masked cell includes a placeholder value for a respective feature that corresponds to a to-be-predicted behavior of a respective agent at a respective time step in the future. FIG. 2 illustrates three example 3D input tensors with different cell masking strategies for different tasks. The neural network 124 is configured to mask certain cells by setting a particular feature to either a zero or a one. In the first example 3D input tensor 202, when the one or more tasks include a behavior prediction task (e.g., a motion prediction task), all of the cells in the 3D input tensor 202 up to a specified time step t are observed cells and all of the cells in the 3D input tensor 202 after the specified time step t are masked cells. In the second example 3D input tensor 204, when the one or more tasks include a conditional behavior prediction task (e.g., a conditional motion prediction task), all of the cells in the 3D input tensor up to a specified time step t are observed cells, and all of the cells in the 3D input tensor after the specified time step t except the cells 206 which corresponds to one or more specified agents are masked cells. The cells 206 which are not masked represent agents whose future behavior the behavior prediction task is conditioned on. In the third example 3D input tensor 208, when the one or more tasks include a goal-directed planning task (e.g., a goal-conditioned motion prediction task), all of the cells in the 3D input tensor 208 up to a specified time step t are observed cells, and all of the cells in the 3D input tensor 208 after the specified time step t except the final cell corresponding to a specified agent at a final time step (e.g., cell 210) are masked cells. The final cell 210 corresponding to the final time step is the goal state and the goal-directed planning task is planning the remaining time step states.

The decoder neural network 116 is configured to process the encoded representation 114 of the 3D input tensor 102 to generate a 4D output tensor 122. The 4D output tensor, which can be denoted as [F, A, T, D], has 4 dimensions: (i) an agent dimension A that represents the one or more agents, (ii) a feature dimension D that represents, for each of the one or more agents, features corresponding to behavior of the agent, and (iii) a time dimension T that represents the plurality of time steps, and (iv) a future dimension of size F that represents F possible future behaviors for each agent at each time step.

The neural network 124 is further configured to process the 4D output tensor 122 using an output neural network to generate a final output for each of the one or more tasks. The output neural network is configured to process the features in each of one or more masked cells (corresponding to one or more agents of interest) in the 3D input tensor 102 to generate a probability distribution over the F possible future behaviors of the respective agent at the respective time. The output neural network may include one or more multi-layer perceptron (MLP) neural network layers.

The final output for each task includes, for each of the F possible futures and for at least a subset of the masked agents and masked time steps, a respective predicted future state of the agent at the time step. The predicted future state can include, for example, the 3-dimensional position of the agent at the time step. Optionally, the state can also include corresponding uncertainty, e.g., parameterized by a Laplace distribution, for each of the coordinates in the 3-dimensional position. Further optionally, the state can also include predicted heading for the agent at the time step.

For tasks that require a marginal behavior prediction, i.e., to predict the behavior of each agent independently, the output neural network is configured to generate a probability distribution that specifies a respective "marginal" confidence score for each of the F possible future behaviors for each agent independently of other agents. The output neural network can generate the "marginal" confidence score for a given agent within one of the F future behaviors from the extra time step element (which is sliced out) for that agent within that future behavior.

For example, assuming that the task is a trajectory prediction for agent A so that the cells that represent agent A's future states are masked, the output neural network is configured to process each of the features for each masked cell independently to generate the probability distribution over F possible trajectories of agent A.

For tasks that require a joint behavior prediction, i.e., to predict the future behaviors (e.g., future trajectories) of two or more agents at the same time, the output neural network is configured to generate a "joint" confidence score for each joint behavior (e.g., each joint trajectory) in a set of joint behaviors that includes a respective individual behavior (e.g., a respective individual trajectory) for each agent. The output neural network can generate a "joint" confidence score for each of the F possible future behaviors from the extra time step element that is sliced out.

Figure 4:
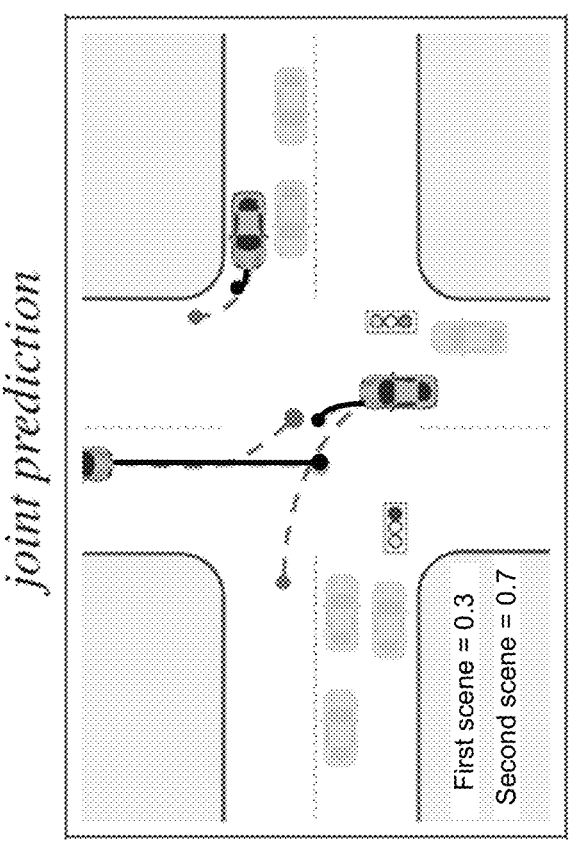
FIG. 4 illustrates an example of marginal behavior prediction and joint behavior prediction for autonomous or semi-autonomous driving.

An example of marginal behavior prediction and joint behavior prediction for autonomous or semi-autonomous driving is shown in FIG. 4. Each of first and second trajectory represents a distinct prediction. The first trajectory prediction is represented by bold dash lines, while the second trajectory prediction is represented by bold, continuous lines. The left figure shows a marginal trajectory prediction for bottom center vehicle. The "marginal" confidence score for the first trajectory is 0.3, and the "marginal" confidence score for the second trajectory is 0.7. In the left figure, the prediction of each trajectory is independent of other vehicle trajectories. The right figure shows a joint trajectory prediction for three vehicles of interest. The "joint" confidence cores indicate likelihood of the entire scene including predicted trajectories of all three vehicles. The "joint" confidence score of the first scene which includes three predicted trajectories represented by three dash lines is 0.3. The "joint" confidence score of the second scene which includes three predicted trajectories represented by three continuous lines is 0.7.

The encoder neural network 104 and the decoder neural network 116 can be attention neural networks that each include multiple attention neural network layers. The encoder neural network 104 and the decoder neural network 116 are jointly trained on the plurality of tasks. Thus, the neural network 124 is a unified model that naturally captures the interactions between agents, and can be trained as a joint model to produce scene-level consistent predictions across all agents. The neural network 124 uses a scene-centric representation for all agents to allow scaling to large numbers of agents in dense environments. Each of the encoder neural network 104 and the decoder neural network 116 employ a variant of self-attention in which the attention mechanism is efficiently factorized across the agent and time dimensions. The resulting architecture alternates attention between dimensions representing time and agents across the scene, resulting in a computationally-efficient, uniform, and scalable architecture.

In particular, the encoder neural network 104 may include a plurality of encoder attention layers 106. Some of the encoder attention layers apply self-attention to the respective inputs across the agent dimension A and some of the encoder attention layers apply self-attention to the respective inputs across the time dimension T.

More specifically, each of the plurality of encoder attention layers 106 is configured to receive a respective encoder attention layer input and to apply an attention mechanism over the respective encoder attention layer input to generate a respective encoder attention layer output. The encoder attention layer input of a first encoder attention layer in the plurality of the encoder attention layers 106 is the 3D input tensor 102. Each of the plurality of encoder attention layers following the first encoder attention layer is configured to receive the encoder attention layer output of the preceding encoder attention layer as the respective encoder attention layer input.

In some implementations, the plurality of encoder attention layers 106 includes an encoder self-attention layer (e.g., the encoder self-attention layer 108) that is configured to apply a self-attention mechanism over the respective encoder attention layer input across the time dimension T. This allows the neural network 124 to compare every time step to every other time step for a single agent.

In some implementations, the plurality of encoder attention layers 106 includes an encoder self-attention layer (e.g., encoder self-attention layer 110) that is configured to apply a self-attention mechanism over the respective encoder attention layer input across the agent dimension A. This allows the neural network 124 to compare every agent to every other agent for an single time step.

An encoder self-attention mechanism maps a query and a set of key-value pairs to an output, where the query, keys, and values are all vectors. The output is computed as a weighted sum of the values, where the weight assigned to each value is computed by a compatibility function of the query with the corresponding key. The query Q, keys K, and values Q are independently created by providing the respective encoder attention layer input of shape [A, T, D] as input to the encoder self-attention layer which applies a linear projection (e.g., a normal learned neural network layer) to each of the A, T, D dimension to create a transformed version of the features. The query, key and value projection layers are independent of each other. Thus the resulting query, keys, and values have different numerical values but the resulting shape of the key, queries and values are still [A, T, D].

When an encoder self-attention layer (e.g., the encoder self-attention layer 108) is configured to apply a self-attention mechanism over the respective encoder attention layer input across the time dimension T, the encoder self-attention layer computes the dot products of the query with all of the keys to compare every time step with every other time step for a single agent, resulting in an intermediate output tensor of shape [A, T, T].

When an encoder self-attention layer (e.g., encoder self-attention layer 110) is configured to apply a self-attention mechanism over the respective encoder attention layer input across the agent dimension A, the encoder self-attention layer computes the dot products of the query with all of the keys to compare every agent with every other agent for a single time step, resulting in an intermediate output tensor of shape [A, A, T].

Applying attention only across the time dimension T allows the encoder neural network 104 to learn smooth trajectories of an agent independent of the identity of the agent. Likewise, applying attention only across the agent dimension A allows the model to learn multi-agent interactions independent of the specific time step. In addition, in order to capture both time and agent dependencies, the encoder neural network 104 may alternate self-attention across agents and time in subsequent layers. The encoder neural network 104 is permutation equivariant to the ordering of the one or more agents at input, since the attention operation is permutation equivariant.

In some implementations, in order to exploit side information such as a road graph, the encoder neural network 104 employs cross-attention to enable the agent features to be updated by attending to the road graph. In these implementations, the plurality of encoder attention layers 106 includes a cross-attention layer (e.g., a cross-attention layer 112) that is configured to apply a cross-attention mechanism over the respective encoder attention layer input across the agent dimension A using the road graph. The road graph may represent dynamic and static elements of the environment. The static elements may include a lane structure and a road layout of the environment. The dynamic elements may include elements in the environment that change over time. During the operations of these cross-attention layers, the road graph may not be updated. This requires that during training, the encoder neural network 104 learns interactions between the road structure and agents that are independent of the specific time step. The encoder neural network 104 may use a road graph representation that shared across all agents in the environment, whereas prior approaches have often used an agent-centric road graph representation. Example techniques for applying self-attention or cross-attention are described in detail in A. Vaswani et. al, "Attention is all you need," Advances in Neural Information Processing Systems, page 5998-6008. (2017).

The decoder neural network 116 includes a plurality of decoder attention layers 117. Each of the plurality of decoder attention layers 117 is configured to receive a respective decoder attention layer input and to apply an attention mechanism over the respective decoder attention layer input to generate a respective decoder attention layer output. The decoder attention layer input of a first decoder attention layer in the plurality of decoder attention layers 117 is the encoded representation 114. Each of the plurality of decoder attention layers following the first decoder attention layer is configured to receive the decoder attention layer output of the preceding decoder attention layer as the respective decoder attention layer input.

In some implementations, the plurality of decoder attention layers 117 includes a decoder self-attention layer (e.g., the decoder self-attention layer 118) that is configured to apply a self-attention mechanism over the respective decoder attention layer input across the time dimension T. This allows the neural network 124 to compare every time step to every other time step for a single agent.

In some implementations, the plurality of decoder attention layers includes a decoder self-attention layer (e.g., the decoder self-attention layer 120) that is configured to apply a self-attention mechanism over the respective decoder attention layer input across the agent dimension A. This allows the neural network 124 to compare every agent to every other agent for an single time step.

An decoder self-attention mechanism maps a query and a set of key-value pairs to an output, where the query, keys, and values are all vectors. The output is computed as a weighted sum of the values, where the weight assigned to each value is computed by a compatibility function of the query with the corresponding key. The query Q, keys K, and values Q are independently created by providing a respective decoder attention layer input of shape [F, A+1, T+1, D] as input to the decoder self-attention layer, which applies a linear projection (e.g., a normal learned neural network layer) to each of the F, A+1, T+1, D dimension to create a transformed version of the features. The query, key and value projection layers are independent of each other. Thus the resulting query, keys, and values have different numerical values but the resulting shape of the key, queries and values are still [F, A+1, T+1, D].

When a decoder self-attention layer (e.g., the decoder self-attention layer 118) is configured to apply a self-attention mechanism over the respective decoder attention layer input across the time dimension T, the decoder self-attention layer computes the dot products of the query with all of the keys to compare every time step with every other time step for a single agent, resulting in an intermediate output tensor of shape [F, A+1, T+1, T+1].

When a decoder self-attention layer (e.g., the decoder self-attention layer 120) is configured to apply a self-attention mechanism over the respective decoder attention layer input across the agent dimension A, the decoder self-attention layer computes the dot products of the query with all of the keys to compare every agent with every other agent for a single time step, resulting in an intermediate output tensor of shape [F, A+1, A+1, T+1].

As described above, after generating the 4D output tensor 122, the decoder neural network 116 is further configured to process the 4D output tensor 122 to generate for each of the one or more tasks a final output that includes, for each of one or more masked cells (corresponding to the one or more agents of interest) in the 3D input tensor 102, a probably distribution over the F possible future behaviors of the respective agent at the respective time. The decoder neural network 116 includes an output neural network that is configured to process the features in each masked cell in the 3D input tensor 102 independently to generate a probability distribution over the F possible future behaviors of the respective agent at the respective time. The output neural network may include one or more multi-layer perceptron (MLP) neural network layers. For example, the one or more MLP neural network layers may be configured to produce a single logit value to be used with a softmax classifier for a permutation equivariant estimate of probabilities of the F possible future behaviors.

The neural network system 100 may provide the final output of the one or more tasks to a control system for a particular agent of the one or more agents for use in controlling the particular agent.

Particular examples of architectures of attention neural networks that include multiple attention layers and that can be modified to include attention layers of the types described in this specification are described in Zihang Dai, Zhilin Yang, Yiming Yang, Jaime Carbonell, Quoc Le, and Ruslan Salakhutdinov. Transformer-XL: Attentive language models beyond a fixed-length context. In Proceedings of the 57th Annual Meeting of the Association for Computational Linguistics, pp. 2978-2988, Florence, Italy, July 2019. Association for Computational Linguistics. doi: 10.18653/v1/P19-1285. URL https://www.aclweb.org/anthology/P19-1285; and Ashish Vaswani, Noam Shazeer, Niki Parmar, Jakob Uszkoreit, Llion Jones, Aidan N. Gomez, Lukasz Kaiser, and Illia Polosukhin. Attention is all you need. Advances in Neural Information Processing Systems, pp. 5998-6008, 2017. URL https://papers.nips.cc/paper/7181-attention-is-all-you-need.pdf.

FIG. 3 is a flow diagram of an example process 300 for performing one or more tasks, in which each of the one or more tasks includes predicting behavior of one or more agents in an environment. For convenience, the process 300 will be described as being performed by a system of one or more computers located in one or more locations. For example, a neural network system, e.g., the neural network system 100 of FIG. 1, appropriately programmed in accordance with this specification, can perform the process 300.

The system obtains a three-dimensional (3D) input tensor representing behaviors of the one or more agents in the environment across a plurality of time steps (step 302).

In particular, to obtain the 3D input tensor, the system may receive as input a temporal representation that includes a characterization of the environment at each of a plurality of time steps, and process, using an input neural network, the temporal representation to generate the 3D input tensor. The input neural network may include one or more multi-layer perceptron (MLP) neural network layers.

The system generates an encoded representation of the 3D input tensor by processing the 3D input tensor using an encoder neural network (step 304). The 3D input tensor has (i) an agent dimension that represents the one or more agents, (ii) a feature dimension that represents, for each of the one or more agents, features corresponding to behavior of the agent, and (iii) a time dimension that represents the plurality of time steps.

The 3D input tensor includes a plurality of observed cells and a plurality of masked cells. Each observed cell includes a specified value for a respective feature that corresponds to an observed behavior of a respective agent at a respective time step, and each masked cell includes a placeholder value for a respective feature that corresponds to a to-be-predicted behavior of a respective agent at a respective time step in the future. Examples of observed cells and masked cells of the 3D input tensor are described above with reference to FIG. 2.

The system processes the encoded representation of the 3D input tensor using a decoder neural network to generate a 4D output tensor (step 306). The 4D output tensor has (i) an agent dimension that represents the one or more agents, (ii) a feature dimension that represents, for each of the one or more agents, features corresponding to behavior of the agent, and (iii) a time dimension that represents the plurality of time steps, and (iv) a future dimension of size F that represents F possible future behaviors for each of the one or more agents at each time step.

The system may further process the 4D output tensor using the decoder neural network to generate, for each masked cell in the 3D input tensor, a probability distribution over the F possible future behaviors of the respective agent at the respective time.

The system may generate an output for the one or more tasks from the F possible future behaviors in the 4D output tensor 122 corresponding to each of the masked cells in the 3D input tensor. The system may provide the output of the one or more tasks to a control system for a particular agent of the one or more agents for use in controlling the particular agent.

The encoder neural network and the decoder neural network can be attention neural networks that each include multiple attention neural network layers. The encoder neural network and the decoder neural network are jointly trained on the plurality of tasks.

In some implementations, during training, the encoder and decoder neural networks may be jointly trained for marginal behavior prediction, i.e., to predict the behavior (or motion) of each agent independently. That means, the neural network is trained to generate a respective confidence score for each trajectory for each agent independently of other agents.

In some other implementations, during training, the encoder and decoder neural networks may be jointly trained for joint behavior prediction, i.e., to predict the future behaviors of two or more agents. In the joint behavior prediction, the neural network is trained to generate a score for each joint trajectory in a set of joint trajectories that includes a respective individual trajectory for each agent.

The training data includes a masking strategy that provides the neural network with all agents as input, but with their future behaviors hidden. Other information such as future traffic light information is also masked out.

Depending on whether the training is for marginal behavior prediction or the joint behavior prediction, the encoder and decoder neural networks are trained to update their respective values of parameters to optimize a marginal loss formulation or a joint loss formulation, respectively. In the marginal formulation, the loss of the best future for every agent is reduced separately; while in the joint formulation, the loss of the best future behavior for all agents is reduced jointly. The final loss composes the regression loss on the trajectory and the classification loss of the best trajectory. A weighted linear combination of the loss terms is used to combine these two losses together. In some implementations, the classification loss weight can be set to be 0.1, while the regression losses can have a weight of 1.0. The weights can be determined using the hold-out validation set.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations.

Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for performing one or more tasks, wherein each of the one or more tasks includes predicting behavior of one or more agents in an environment, the method comprising:

obtaining a three-dimensional (3D) input tensor representing behaviors of the one or more agents in the environment across a plurality of time steps, the 3D input tensor having (i) an agent dimension that represents the one or more agents, (ii) a feature dimension that represents, for each of the one or more agents, features corresponding to behavior of the agent, and (iii) a time dimension that represents the plurality of time steps;

generating an encoded representation of the 3D input tensor by processing the 3D input tensor using an encoder neural network, wherein the 3D input tensor comprises a plurality of observed cells and a plurality of masked cells, wherein each observed cell includes a specified value for a respective feature that corresponds to an observed behavior of a respective agent at a respective time step, and each masked cell includes a placeholder value for a respective feature that corresponds to a to-be-predicted behavior of a respective agent at a respective time step in the future; and processing the encoded representation of the 3D input tensor using a decoder neural network to generate a 4D output tensor, the 4D output tensor having (i) an agent dimension that represents the one or more agents, (ii) a feature dimension that represents, for each of the one or more agents, features corresponding to behavior of the agent, and (iii) a time dimension that represents the plurality of time steps, and (iv) a future dimension of size F that represents F possible future behaviors for each of the one or more agents at each time step.

2. The method of claim 1, further comprising generating an output for the one or more tasks from the F possible future behaviors in the 4D output tensor corresponding to each of the masked cells.

3. The method of claim 2, further comprising providing the output of the one or more tasks to a control system for a particular agent of the one or more agents for use in controlling the particular agent.

4. The method of claim 1, wherein the one or more tasks comprise at least one of a behavior prediction task, a conditional behavior prediction task, or a goal-directed planning task.

5. The method of claim 1, wherein when the one or more tasks include a behavior prediction task, all of the cells in the 3D input tensor up to a specified time step are observed cells and all of the cells in the 3D input tensor after the specified time step are masked cells.

6. The method of claim 1, wherein when the one or more tasks include a conditional behavior prediction task, all of the cells in the 3D input tensor up to a specified time step are observed cells, and all of the cells in the 3D input tensor after the specified time step except the cells corresponding to one or more specified agents are masked cells.

7. The method of claim 1, wherein when the one or more tasks include a goal directed planning task, all of the cells in the 3D input tensor up to a specified time step are observed cells, and all of the cells in the 3D input tensor after the specified time step except the cells corresponding to a specified agent at a final time step are masked cells.

8. The method of claim 1, wherein obtaining the 3D tensor comprises:

receiving as input a temporal representation that includes a characterization of the environment at each of a plurality of time steps, and processing, using an input neural network, the temporal representation to generate the 3D input tensor.

9. The method of claim 1, further comprising processing the 4D output tensor to generate, for each masked cell in the 3D input tensor, a probability distribution over the F possible future behaviors of the respective agent at the respective time.

10. The method of claim 1, further comprising using the probability distribution over the F possible future behaviors to control at least one of the one or more agents.

11. The method of claim 1, wherein the encoder neural network comprises a plurality of encoder attention layers, each of the plurality of encoder attention layers configured to receive a respective encoder attention layer input and to apply an attention mechanism over the respective encoder attention layer input to generate a respective encoder attention layer output.

12. The method of claim 11, wherein the encoder attention layer input of a first encoder attention layer in the plurality of the encoder attention layers is the 3D input tensor, and wherein each of the plurality of encoder attention layers following the first encoder attention layer is configured to receive the encoder attention layer output of the preceding encoder attention layer as the respective encoder attention layer input.

13. The method of claim 11, wherein the plurality of encoder attention layers includes an encoder self-attention layer that is configured to apply a self-attention mechanism over the respective encoder attention layer input across the time dimension.

14. The method of claim 11, wherein the plurality of encoder attention layers includes an encoder self-attention layer that is configured to apply a self-attention mechanism over the respective encoder attention layer input across the agent dimension.

15. The method of claim 11, wherein the plurality of encoder attention layers includes a cross-attention layer that is configured to apply a cross-attention mechanism over the respective encoder attention layer input across the agent dimension using a road graph.

16. The method of claim 15, wherein the road graph represents dynamic and static elements of the environment.

17. The method of claim 16, wherein the static elements include a lane structure and a road layout of the environment.

18. The method of claim 16, wherein the dynamic elements include elements in the environment that change over time.

19. The method of claim 11, wherein the decoder neural network comprises a plurality of decoder attention layers, each of the plurality of decoder attention layers configured to receive a respective decoder attention layer input and to apply an attention mechanism over the respective decoder attention layer input to generate a respective decoder attention layer output.

20. The method of claim 19, wherein the decoder attention layer input of a first decoder attention layer in the plurality of decoder attention layers is the encoded representation, and wherein each of the plurality of decoder attention layers following the first decoder attention layer is configured to receive the decoder attention layer output of the preceding decoder attention layer as the respective decoder attention layer input.

21. The method of claim 19, wherein the plurality of decoder attention layers includes a decoder self-attention layer that is configured to apply a self-attention mechanism over the respective decoder attention layer input across the time dimension.

22. The method of claim 19, wherein the plurality of decoder attention layers includes a decoder self-attention layer that is configured to apply a self-attention mechanism over the respective decoder attention layer input across the agent dimension.

23. The method of claim 1, wherein the encoder neural network and the decoder neural network are jointly trained on a plurality of tasks that include the one or more tasks.

24. One or more non-transitory computer-readable storage media storing instructions that, when executed by one or more computers, cause the one or more computers to perform operations for performing one or more tasks, wherein each of the one or more tasks includes predicting behavior of one or more agents in an environment, the operations comprising:

obtaining a three-dimensional (3D) input tensor representing behaviors of the one or more agents in the environment across a plurality of time steps, the 3D input tensor having (i) an agent dimension that represents the one or more agents, (ii) a feature dimension that represents, for each of the one or more agents, features corresponding to behavior of the agent, and (iii) a time dimension that represents the plurality of time steps;

generating an encoded representation of the 3D input tensor by processing the 3D input tensor using an encoder neural network, wherein the 3D input tensor comprises a plurality of observed cells and a plurality of masked cells, wherein each observed cell includes a specified value for a respective feature that corresponds to an observed behavior of a respective agent at a respective time step, and each masked cell includes a placeholder value for a respective feature that corresponds to a to-be-predicted behavior of a respective agent at a respective time step in the future; and processing the encoded representation of the 3D input tensor using a decoder neural network to generate a 4D output tensor, the 4D output tensor having (i) an agent dimension that represents the one or more agents, (ii) a feature dimension that represents, for each of the one or more agents, features corresponding to behavior of the agent, and (iii) a time dimension that represents the plurality of time steps, and (iv) a future dimension of size F that represents F possible future behaviors for each of the one or more agents at each time step.

25. A system comprising one or more computers and one or more non-transitory computer-readable storage media storing instructions that, when executed by the one or more computers, cause the one or more computers to perform operations for performing one or more tasks, wherein each of the one or more tasks includes predicting behavior of one or more agents in an environment, the operations comprising:

obtaining a three-dimensional (3D) input tensor representing behaviors of the one or more agents in the environment across a plurality of time steps, the 3D input tensor having (i) an agent dimension that represents the one or more agents, (ii) a feature dimension that represents, for each of the one or more agents, features corresponding to behavior of the agent, and (iii) a time dimension that represents the plurality of time steps;

generating an encoded representation of the 3D input tensor by processing the 3D input tensor using an encoder neural network, wherein the 3D input tensor comprises a plurality of observed cells and a plurality of masked cells, wherein each observed cell includes a specified value for a respective feature that corresponds to an observed behavior of a respective agent at a respective time step, and each masked cell includes a placeholder value for a respective feature that corresponds to a to-be-predicted behavior of a respective agent at a respective time step in the future; and processing the encoded representation of the 3D input tensor using a decoder neural network to generate a 4D output tensor, the 4D output tensor having (i) an agent dimension that represents the one or more agents, (ii) a feature dimension that represents, for each of the one or more agents, features corresponding to behavior of the agent, and (iii) a time dimension that represents the plurality of time steps, and (iv) a future dimension of size F that represents F possible future behaviors for each of the one or more agents at each time step.

* * * * *